Nov. 1, 1955  H. G. TATOSIAN  2,722,178
APPARATUS FOR TRANSFERRING CAKES AND THE LIKE
Filed June 24, 1952  4 Sheets-Sheet 4
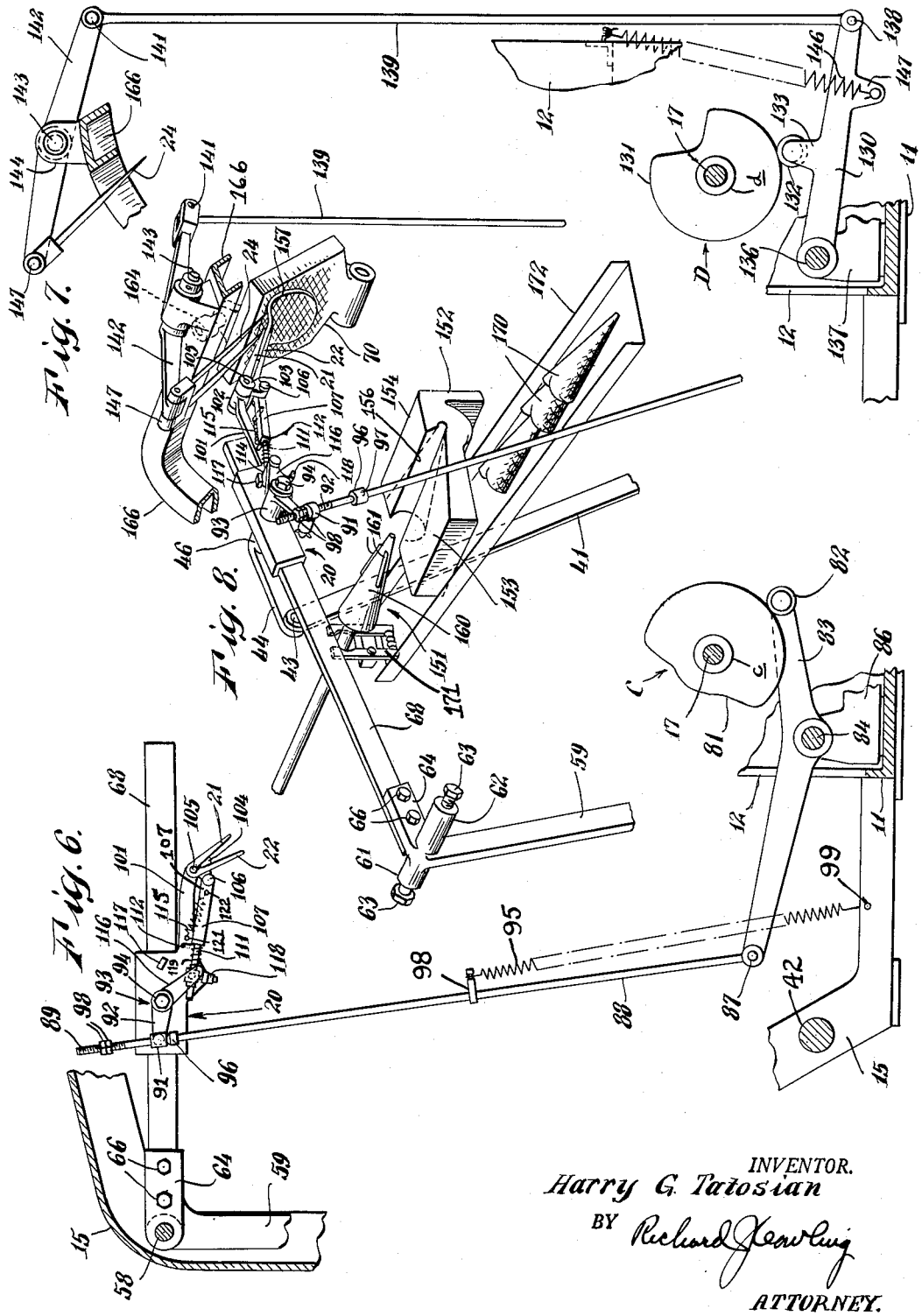
INVENTOR.
Harry G. Tatosian
BY Richard Rawling
ATTORNEY.

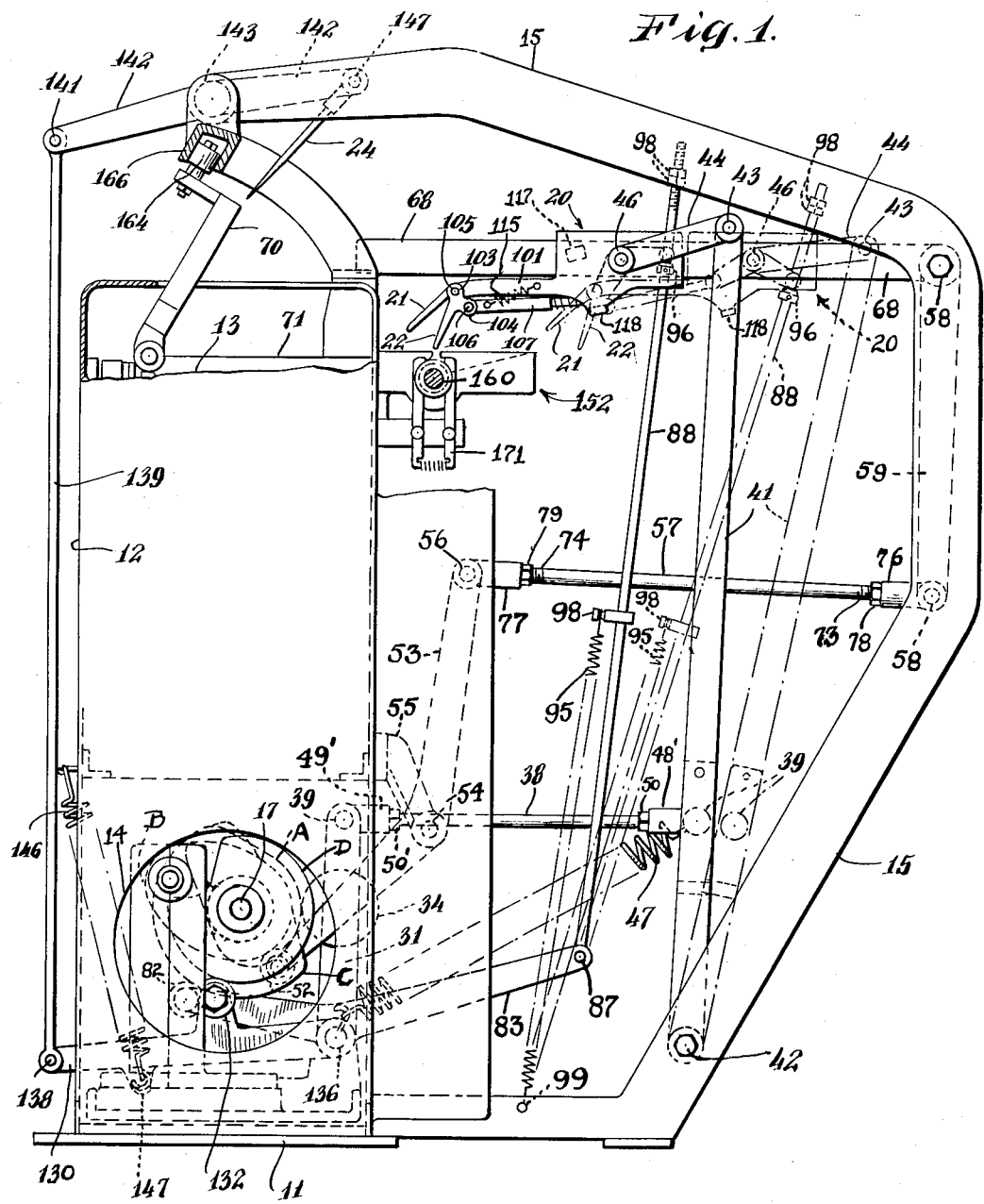

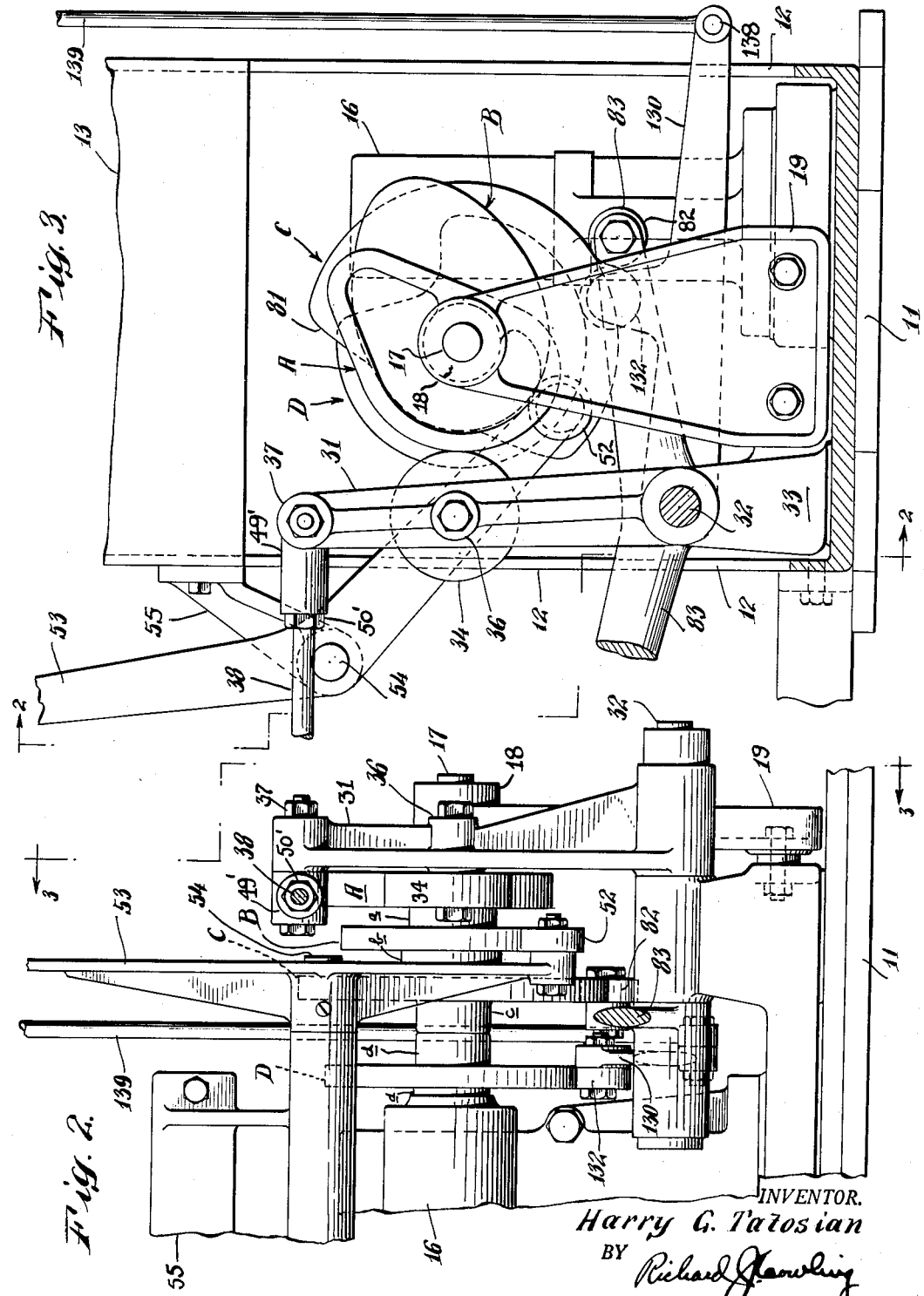

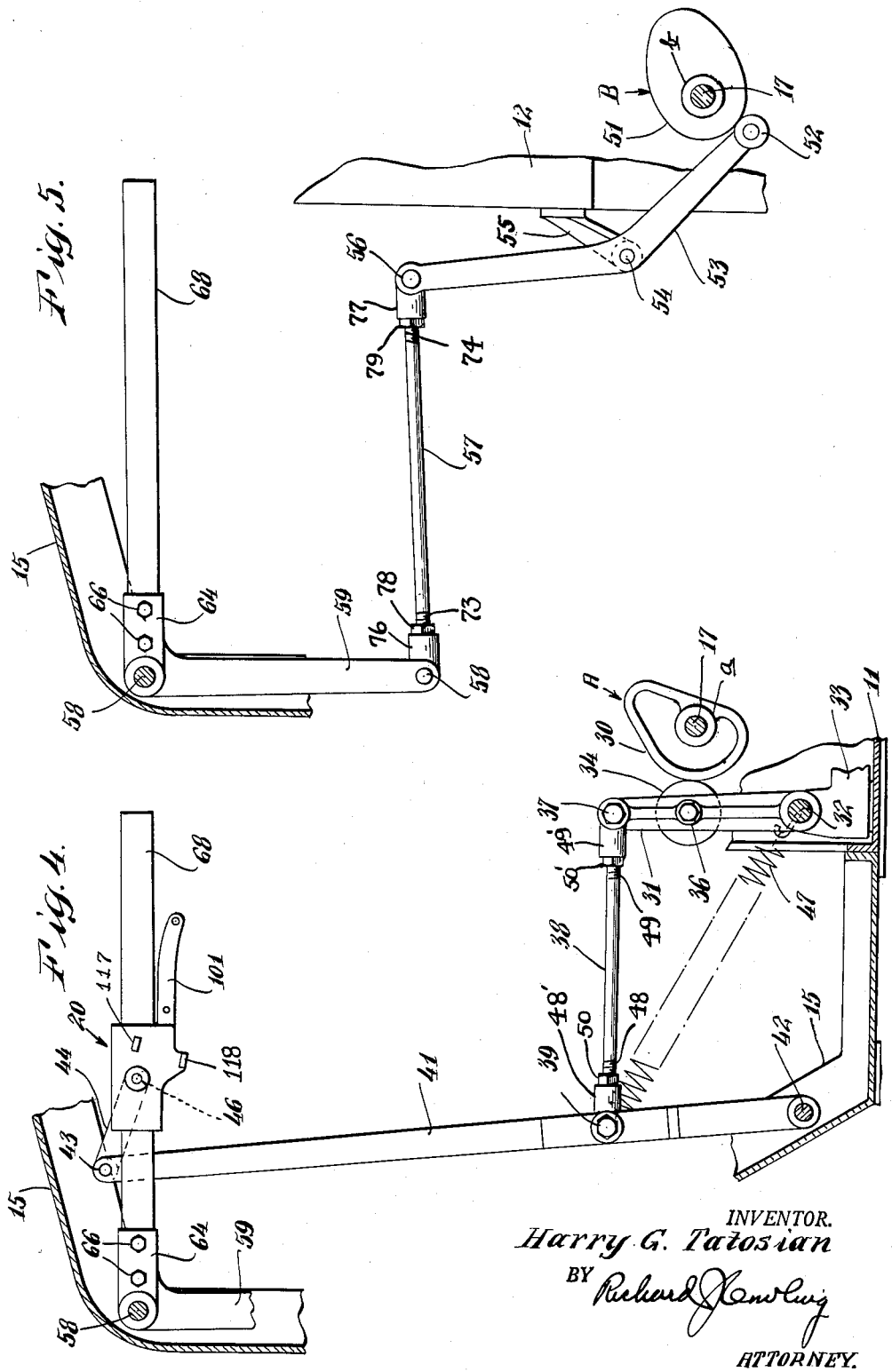

United States Patent Office 2,722,178
Patented Nov. 1, 1955

2,722,178

APPARATUS FOR TRANSFERRING CAKES AND THE LIKE

Harry G. Tatosian, Bronx, N. Y., assignor to Sugar Shell Corporation, New York, N. Y., a corporation of New York Application June 24, 1952, Serial No. 295,287

5 Claims. (Cl. 107—58)

The present invention relates generally to automatic pastry baking and shaping apparatus, and it has relation more particularly to devices synchronized for automatically removing flexible baked cakes from their respective baking plates, transferring and depositing such cakes to a cake receiver, which may be a conventional cone-forming machine.

There is shown in my United States Letters Patent No. 2,213,727, issued September 3, 1940, a semi-automatic machine for making cones, including a batter depositing means, driving mechanism for an endless series of baking plates, mechanism for loosening an edge of a baked cake from its baking plate, and the necessary gearing, etc. for operating the same. With the operation of this machine, it was necessary to transfer manually the baked cakes from their baking plates to the cake receiver or cone-forming machine.

The first wholly automatic machine for making, baking, transferring and forming baked cakes into cones is shown in my United States Letters Patent No. 2,321,634, issued June 15, 1943, wherein the manual transfer operation of my earlier machine was replaced by fully automatic means.

The present invention is directed specifically to improved devices for removing and transferring the baked cakes from their respective baking plates to a cake receiver, which may be a conventional cone-shaping apparatus. In the description of the present invention, the obvious and conventional features of the machine, which are shown in detail in my prior aforementioned Letters Patent, will not be described herein except insofar as they may relate to the operation of the mechanisms utilized in the actuation of the improved devices forming the subject-matter of this application.

An object of the present invention is to provide an improved automatically and successively operated transfer mechanism, which is more efficient, economical and inexpensive in construction.

A further object of the invention is the provision of an improved transfer mechanism that is much quieter and smoother in operation and more positive and accurate for transferring the flexible cakes.

Another object of the invention is an improved transfer mechanism which is readily adjustable, and in which worn or broken parts may be easily and quickly repaired or replaced, without necessitating dismantling of the entire mechanism.

Other and further objects, advantages and features of the present invention will appear from the subjoined and detailed construction of the several devices, and which will be apparent from the following description, wherein one specific embodiment thereof is illustrated, reference being had to the accompanying drawings, forming a part hereof, wherein like numerals indicate like parts, in which:

Figure 1 is an end view of a machine embodying the invention, with the end cover plate partially broken away to show one of the baking plates in its open position at the time the flexible baked cake is ready to be loosened therefrom;

Figure 2 is an enlarged fragmentary front elevational view, showing the control driving cams viewed substantially along the line 2—2 of Figure 3, looking in the direction of the arrows;

Figure 3 is a fragmentary front elevational view, partly in section, taken substantially along the line 3—3 of Figure 2, looking in the direction of the arrows;

Figure 4 is a schematic illustration, on a slightly different scale, of the cam, cam lever and linkage arrangement for operating the sliding carriage which serves to reciprocate the sliding gripper jaws between the baking plates and the cone-forming machine;

Figure 5 is a schematic illustration of the cam, cam lever and linkage arrangement for vertically tilting the balance arm forming the trackway over which the slidable gripper jaws in Figure 4 are operated;

Figure 6 is a schematic illustration of the cam, cam lever and linkage arrangement which serves to open and close the gripper jaws for grasping and releasing the flexible cake held therebetween;

Figure 7 is a schematic illustration of the cam, cam lever and linkage arrangement required to operate the stripping prongs which serve to pry loose an edge of a baked cake from its respective baking plate; and Figure 8 is a fragmentary perspective view, on a slightly smaller scale, of the shaping mechanism, and showing the coordinating operations of prying loose a portion of an edge of a baked cake from its baking plate, the grasping of the loosened edge by the gripper jaws, which remove it entirely from said baking plate and then slidably deliver it into a receiving slot in the table top of a conventional cone-forming machine.

The machine of the present invention comprises essentially a coordinate system driven from a common motor and reduction gearing unit for extruding a predetermined charge of batter upon baking irons, moving the endless chain of baking irons intermittently at a predetermined rate over a heater to form baked flexible cakes, automatically removing the cakes from the baking irons and delivering them by gripper mechanism to a cake receiver, which, in the illustrations shown in the present drawings, is a conventional cone-forming machine, but, of course, may be any other device such as a packaging station. The obvious and conventional features of the present machine are each shown and described in detail in my aforementioned Letters Patent, and will not therefore be again described herein, since such details are unimportant insofar as the description and understanding of the present invention are concerned.

The present machine is built upon a suitable base member 11 between an upright frame structure 12, having cover plates 13 for enclosing the operating mechanisms. The cover plates 13 at opposite ends of the machine are each provided with a large aperture 14, which apertures are in alignment with each other and the driving shaft 17, permitting ready access thereto for assembling, repairing and replacing. A pentagonal channel frame 15 of an inverted U-shaped construction extends outwardly forwardly of the machine through an arc of approximately 180 degrees, as best shown in Figure 1, and serves as a suitable mounting for the several linkage arrangements comprising the transfer mechanisms of the present invention.

The control and driving mechanism

The control and drive mechanism for the entire machine is located on the base member 11. A source of motive power is indicated by the reduction gear unit 16, which is in turn driven by a conventional electric motor (not shown). The motor is driven at a continuous predetermined speed which, through the reduction gear unit 16, determines the speed of production of the machine. The motor drives the reduction gear unit 16 by a direct drive connection, and the various transfer mechanisms are driven through cams mounted fixedly directly on a driven shaft 17 of the reduction gear unit 16. The driven shaft 17 has its free outer end journalled in a bearing 18 mounted in a bracket 19, as best shown in Figure 3. The batter feeding mechanism and the driving elements for the baking plates are neither shown nor described herein since such features are conventional and are disclosed in detail in my aforementioned Letters Patent.

The cam A, which has integrally formed and oppositely extending spacing hubs a, is keyed to the driven shaft 17, and serves, through suitable linkage arrangement as best shown in Figure 4, to operate and control the reciprocation of the slidable member 20 carrying the gripping jaws 21 and 22 between the baking plates and the cake receiver.

The cam B, which has an integrally formed spacing hub b, is likewise keyed to the driven shaft 17, and serves, through suitable linkage arrangements as best shown in Figure 5, to pivot or tilt or raise and lower the balance arm 68 forming a trackway over which the slidable member 20 moves toward and away from the baking plates and the cake receiver.

The cam C, which has an integrally formed spacing hub c, is also keyed to the driven shaft 17, and serves, through suitable linkage arrangements as best shown in Figure 6, to open and close the gripping jaws 21 and 22 carried by the slidable member 20.

The cam D, which has integrally formed and oppositely extending spacing hubs d, is also keyed to the drive shaft 17, and serves, through suitable linkage arrangements as best shown in Figure 7, to operate the stripping prongs 24, which are used to peel away an upper portion of a flexible baked cake from its adhering baking plate or iron, as best shown in Figure 8. The construction and operation of these stripping prongs 24 are identical to those shown and described in my Patent No. 2,321,634 aforementioned.

*Mechanism for reciprocating cake gripper*

Referring now to Figure 4, there is shown schematically the mechanism for reciprocating the slidable carriage member 20 upon which the cake gripper jaws 21 and 22 are mounted. The cam A, which is keyed to the continuously driven shaft 17, has a cam conformation or periphery 30. A vertically extending lever 31 is mounted pivotally as at 32 on a suitable supporting bracket 33 secured to the base 11 of the machine. The lever 31 has a cam follower 34 mounted rotatably, as indicated at 36, intermediate its ends. The upper free end of the lever 31 is connected pivotally, as indicated at 37, to a substantially horizontal adjustable link member 38. The opposite end of the adjustable link member 38 is connected pivotally, as indicated at 39, intermediate the ends of an upstanding lever 41. The lower end of the lever 41 is mounted pivotally, as indicated at 42, in a lower section of the pentagonal channeled frame structure 15. The upper end of the lever 41 is connected pivotally, as indicated at 43, to a relatively short link member 44. The link member 44 has its opposite end connected pivotally, as indicated as 46, to one side of the sliding member 20 carrying the gripping jaws consisting of the fingers 21 and 22 (see Figure 6). A tension spring 47, having one end fastened to the pivot 39 and its opposite end fastened to the pivot 32, serves to urge the cam follower 34 against the peripheral cam conformation 30 of the cam A, thereby insuring constant and continuous contacting action therebetween.

The opposite ends of the adjusting link 38 are threaded, as indicated at 48 and 49. The threads 48 on the left end of the link 38 are left hand threads, and engage a correspondingly threaded axial bore in the connecting sleeve 48'. The threads 49 on the right end of the link 38 are right hand threads, and engage a correspondingly threaded axial bore in the connecting sleeve 49'. The threaded ends 48 and 49 are secured in their desired fixed positions by conventional lock nuts 50 and 50'. It will be apparent that when the link 38 is rotated in one direction it becomes shorter as the threaded ends are threaded farther into their respective sleeves, and that, when the link 38 is rotated in the opposite direction, the link 38 becomes longer as the threaded ends extend farther out of said sleeves. With a longer link 38, the slidable member 20 is moved a greater distance over the balance arm 68, and with a shorter link 38, the distance which the slidable member 20 is moved over its balance arm 68 is proportionately decreased. In this manner it is possible to adjust the cam linkage arrangements to move the slidable member 20 with its actuating jaws 21 and 22 the exact distance required to transfer the cake from its baking plate to the cake receiver.

Referring now to Fig. 5, there is shown schematically the operating mechanism for raising and lowering the normally horizontally extending balance arm or trackway 68 over which the carriage member 20 reciprocates. This mechanism is controlled through suitable leverage and linkage arrangements through operation of the cam B. The elliptically shaped cam B is keyed to the driven shaft 17 of the reduction gear unit 16, and has a peripheral cam track or conformation 51. A cam follower 52 is journalled on one end of an angular lever 53, which is pivoted intermediate its ends, as indicated at 54, on a bracket 55 fastened in any suitable manner to the frame structure 12. The opposite or upper end of the lever 53 is connected pivotally, as indicated at 56, to an adjustable substantially horizontally extending link member 57. The adjustable link member 57 is, in turn, connected pivotally, as indicated at 58, to an inverted L-shaped lever member 59. The L-shaped lever member 59 at the junction of its arms is provided with oppositely and laterally extending studs 61 and 62 (see Figure 8), which extend transversely substantially the width of the U-shaped channel of the frame structure 15, and each stud is internally threaded axially to receive a mounting bolt 63 for securing the lever 59 pivotally between the channel arms of the pentagonal frame structure 15. The shorter arm 64 of the L-shaped lever 59 extends normally horizontally forwardly of the machine. This arm 64 is apertured for receiving fastening bolts 66, which serve to mount an extension 68, as best shown in Figure 8. The extension 68 is rectangular in cross-section, and serves as a balance arm or trackway for the sliding member 20, carrying the clamping fingers 21 and 22. By making the balance arm trackway 68 a separable extension of the short arm 64 of the lever 59, it may be removed easily and replaced with a new trackway at any time without requiring dismantling of the entire linkage arrangement. It will be noted that the rear or inward end of the extension 68, which is that end of the arm or trackway approaching the baking plates 70 and 71, is freely suspended for raising and lowering by means of the L-shaped lever 59 and its arm 64.

It will be noted that the opposite ends 73 and 74 of the adjustable link 57 are threaded and threadingly engage suitable connecting sleeves 76 and 77, having correspondingly threaded axial bores. The threads 73 on the left end of the link 57 are left hand threads, and the threads 74 on the right end thereof are right hand threads. These threaded ends 73 and 74 are fixedly locked in any desired position within their respective internally threaded sleeves 76 and 77 by means of suitable lock nuts 78 and 79. It will be obvious that, when the link 57 is rotated in one direction, it will become shorter, and, when rotated in the opposite direction, it will become longer. The longer the link 57 becomes the greater will be the pivotal movement of the balance arm or trackway 68, and, conversely, the shorter the link 57 is made, the shorter will be the pivotal distance the arm or trackway 68 will be raised or lowered with respect of its normal horizontal position. Thus, it will be readily apparent that the adjustability of the linkage arrangement of the cam B, through the shortening or lengthening of the link 57, will control the disance the outer end of the arm 68 may be moved in a vertical plane with respect to its normal horizontal position. While one setting is sufficient for any given set of baking plates 70 and 71, it is necessary to provide such an adjustment whenever smaller or larger baking plates are substituted for the plates 70 and 71 in making different sized cakes.

The clamping or gripping mechanism

Referring now to Figure 6, there is illustrated schematically the cam linkage arrangement for opening and closing the clamping fingers or jaws 21 and 22, which are controlled and manipulated in the first instance by operation of the cam C.

The cam C, which is keyed to the driven shaft 17 supported at its extreme end by the bracket 19, has a peripheral cam track 81 which engages a cam follower 82 journalled in the lower end of an angular lever 83. The angular lever 83 is mounted pivotally intermediate its ends, as indicated at 84, in a suitable supporting bracket 86 mounted on the base 11 of the machine. The opposite or upper arm of the angular lever 83 is connected pivotally, as indicated at 87 to a connecting rod 88. The upper end of the connecting rod 88 is threaded, as indicated at 89, and projects through a sleeve 91 formed integrally with one arm 92 of a lever 93 mounted pivotally on one side of the carriage member 20, as indicated at 94 (see Figure 8). The rod 88 has a stop in the form of a sleeve 96 mounted fixedly thereon by a set screw 97 below the sleeve 91 of the lever arm 92. The stop 96 engages the underside of the sleeve 91 of the lever 93, and the nuts 98 mounted on the threads 89 and spaced upwardly from the sleeve 91 engage the topside of the sleeve 91. Manipulation of the arm 92 of the lever 93 is thus controlled by means of the rod 88 and the engaging stop 96 and nuts 98. The cam follower 82 is maintained under spring pressure at all times in contact with the cam conformation 81 by means of a spring 95, which has its upper end secured to a fastening member 98 mounted intermediate the ends of the connecting rod 88 and its lower end secured, as indicated at 99, to the base of the machine immediately below the lever 83.

The gripping jaws, consisting of the two clamping fingers 21 and 22, are mounted operatively on the end of an arm 101 formed integrally with the member 20 and projecting rearwardly thereof. The clamping finger 21 is formed integrally with the arm 101 as a continuation thereof, and consequently is stationary at all times. The clamping finger 22 has integrally formed bosses extending outwardly from its opposite sides in a vertical plane, as indicated at 103 and 104 (see Figure 1). The boss 103 is apertured for mounting the same pivotally to the fixed clamping finger 21, as indicated at 105. The boss 104 is likewise apertured for securing pivotally, as indicated at 106, one end of a rod 107, which is square-shaped in cross-section. The rod 107 projects forwardly of the machine, becoming reduced in size and round in cross-section, as indicated at 111, forming a shoulder 112 intermediate its ends. The forward end of the round portion 111 of the rod 107 is mounted removably in a boss 114 formed integrally with the outer end of the arm 116 of the lever 93. A coiled spring 115, which is mounted axially between the shoulder 112 and the boss 114, serves to exert longitudinal pressure on the clamping finger 22 when the same is extended to its grasping position. A stop 117 is formed integrally on the side of the slidable member 20 above the arm 101, and serves to limit the upward movement of the boss 114. A second stop 118 is formed integrally on the side of the slidable member 20 below the arm 101, and serves to limit the downward movement of the arm 116. A spring 119 has one end fastened, as indicated at 121, to the projections 101 and its opposite end connected, as indicated at 122, to the rod, and serves to hold the lower movable clamping finger 22 in its open position and prevent wobbling.

The cake stripping mechanism

Referring now to Figure 7, there is shown schematically the cake stripping mechanism which is motivated through movement of the cam D and its cam follower, levers and linkage arrangement.

The cam D is keyed to the driven shaft 17 of the gear reduction unit 16, and has a peripheral cam track 131, which engages a cam follower 132 that is journalled between spaced bosses 133 formed integrally intermediate the ends of a lever 130. The lever 130 has one end mounted pivotally, as indicated at 136, to a supporting bracket 137 mounted on the base 11 of the machine. The opposite or free end of the lever 130 is connected pivotally, as indicated at 138, to a connecting rod 139 extending upwardly to the top of the machine. The connecting rod 139 is, in turn, connected pivotally, as indicated at 141, to one end of a lever 142, which is connected pivotally intermediate its ends, as indicated at 143, to a bracket 144 mounted on the end of the pentagonal frame structure 15 immediately above the baking plates 70 and 71. A spring 146 is fastened at its lower end to a projection 147 extending downwardly from the lever 130 at a point midway between the boss 133 and the pivot 138. The upper end of the spring 146 is fastened to a portion of the frame structure 12 above the top of the cam D. This spring 146 serves to maintain the cam follower 132 into operating contact at all times with the peripheral cam track 131 of the cam D.

The two-pronged fork 24 is mounted pivotally on the outer end of the lever 142, as indicated at 147. The details of the construction and operation of this stripper fork mechanism are fully shown and described in the drawings of my Letters Patent No. 2,321,634, and further detailed description or explanation of the same is not believed necessary herein since it forms no part of the present invention.

Cone forming mechanism

There is shown diagrammatically in Figures 1 and 8 a cone-forming mechanism indicated generally by the numeral 151, and consisting of a conical female mold 152 mounted on an axis substantially parallel to the hinged axis of the baking irons 70 and 71 in their stationary discharge position, and is formed with a pair of opposed flanges 153 and 154 to define a slot 156 constituting an entry opening for the cake 157 into the interior thereof.

The mandrel or shaper 160 has a series of spaced teeth 161 thereon extending longitudinally of its face for gripping the cone blank or cake 157 in the process of the formation of the cone. The actuation of the mandrel 160 is synchronized with the cake transferring mechanism in the identical manner described in my Letters Patent No. 2,321,634, and since it forms no part of the present invention need not be further explained herein.

Summary of operations

With the present invention, the operation of the machine is completely automatic and no manual operations are involved once the machine is started. The reduction gear unit 16, which drives continuously the shaft 17, effects through the various cam arrangements all of the operations in proper sequence and coordination.

The batter storing and feeding mechanisms (not shown) are of the type to charge each bottom section 71 of the horizontal baking molds, as it passes thereby, with sufficient fluid batter to form the desired sized cake.

The baking plates 70 and 71 are arranged in an endless chain and are moved intermittently through a baking oven, which is not shown in detail in the present drawings but which is clearly indicated in the drawings of my aforementioned Letters Patent No. 2,213,727. After the cakes are baked to the proper degree, their baking plates 70 and 71 emerge from the oven and are opened, as shown in Figure 1, by the roller 164 mounted on the top cover plate 70 entering the arcuately raised guide track section 166. The guidetrack section 166 is arranged to maintain the upper plate 70 in its open position, which is shown in Figure 1, long enough to remove the baked cake 157 and to permit recharging of the empty bottom horizontal baking plate 71 with another charge of dough batter for making another cake.

The baking plates 70 and 71 are so designed that, when the upper plate 70 is opened by the guide track section 166 and the roller 164, the plastic batter cake 157 always adheres to the upper plate 70, as illustrated in Figure 8.

A stripping mechanism, desirably in the form of a two-pronged fork 24 adapted to ride in the indentations of the grille face of the upper baking plate 70, is located in position above the top of the cake 157 at an angle corresponding substantially to that of the upper baking plate 70. Suitable linkage arrangements, which are shown in detail schematically in Figure 7 and controlled by the cam D, operate the pronged fork 24 against the baking plate 70 to strip or peel away a top portion thereof for grasping by the fingers 21 and 22 of the gripping jaws.

The gripping jaws consisting of the fingers 21 and 22 are arranged to be carried rearwardly of the machine by the sliding carriage 20 being moved along the balance arm or trackway 68 towards the partially peeled cake 157. The movement of the slidable member or carriage 20 along the pivotal bar or trackway 68 is caused and controlled by the cam A, through suitable linkage arrangements, which are shown in detail schematically in Figure 4.

Actuation of the balance rod or bar 68, which is first pivoted upwardly towards the top of the top baking plate 70 to bring the gripping fingers 21 and 22 into position to grasp the peeled down edge of the baked cake 157, and secondly pivoted downwardly to bring said gripping fingers 21 and 22 into position to discharge the baked cake 157 into the receiving slot of the cake former or receiver 151, is controlled by the cam B, through suitable linkage arrangements, which are shown in detail schematically in Figure 5.

The opening and closing of the fingers 21 and 22 of the gripper jaws are controlled at the proper time by the cam C, through suitable linkage arrangements and stops, which are shown in detail schematically in Figure 6.

While the motivation of the gripper fingers 21 and 22 is taking place and the baked cake is being rolled into the form of a cone, the baking plates 70 and 71 have been advanced one position. The spindle 160 of the cone former 151 is rotated during the period of engagement with the batter cake 157 introduced into the receiving slot between the plates 153 and 154 to form it instantly into cone-shape. The finished rolled cone 170 is withdrawn from the mold 152 adhering to the spindle 160, and, when the spindle moves backwardly or outwardly from the forming mold 152, it strikes the stripper mechanism 171, forcing the rolled cone 170 off onto the conveyor 172, as best shown in Figure 8.

Although I have shown and described in detail only one modification of the invention, it will be readily understood by those skilled in the art that the same is not to be so limited, but that various modifications may be made therein without departing from the spirit thereof or from the scope of the appended claims.

What I claim is:

1. In a machine for making cones having a series of baking plates moving intermittently and a cake receiver, a transferring mechanism for cyclically removing flat cakes adhering to said baking plates and delivering them to said cake receiver, including a series of spaced cams mounted fixedly on a continuously driven shaft, linkage arrangement adapted to be operated by one of said cams for pivoting a trackway balance arm fulcrumed only at its inner end and having its free end extending over said cake receiver to said baking plates, linkage arrangements operated by a second cam for reciprocating a slidable member carrying a pair of jaws over said trackway, the weight of said slidable member on said balance arm trackway causing its linkage arrangement to be in contact with its cam at all times, and linkage arrangement operated by a third cam for opening and closing said jaws carried by said slidable member.

2. In a machine for making cones having a series of baking plates moving intermittently and a cake receiver, a transferring mechanism for cyclically removing flat cakes adhering to said baking plates and delivering them to said cake receiver, including a series of spaced peripheral cams mounted fixedly on a continuously driven shaft, linkage arrangement including a bell crank lever adapted to be operated by one of said cams for pivoting a balance arm trackway having a free end extending into operating position between said cake receiver and baking plates, parallel linkage arrangement adapted to be operated by a second cam for reciprocating a slidable member carrying a pair of clamping jaws over said trackway, the weight of said slidable member on said trackway maintaining its linkage arrangement in contact with its cam, and linkage arrangement including a bell crank lever operated by a third cam for opening and closing said jaws of said slidable member.

3. In a machine for making cones having a series of baking plates moving intermittently and a cake receiver, a transferring mechanism for cyclically removing flat cakes adhering to said baking plates and delivering them to said cake receiver, including a series of spaced cams mounted fixedly on a continuously driven shaft, linkage arrangement adapted to be operated by one of said cams for pivoting a balance arm trackway having a free end extending over said cake receiver to said baking plates, linkage arrangement having spring urging means for maintaining it in operative relation with a second cam for reciprocating a slidable member carrying a pair of jaws over said trackway, and linkage arrangement having spring urging means for maintaining it in operative relation with a third cam for opening and closing said jaws, said linkage arrangement for pivoting said balance arm trackway being maintained in operative relation with its cam by means of the weight of said slidable member.

4. In a machine for making cones having a series of baking plates moving intermittently and a cake receiver, a transferring mechanism for cyclically removing flat cakes adhering to said baking plates and delivering them to said cake receiver, including a series of spaced cams mounted fixedly on a continuously driven shaft, linkage arrangement including an adjustable link adapted to be operated by one of said cams for pivoting a balance arm trackway, said trackway being mounted separably and having a free end extending over said cake receiver to said baking plates, linkage arrangement including an adjustable link operated by a second cam for reciprocating a slidable member carrying a pair of jaws over said arm, the weight of said slidable member on said trackway maintaining its linkage arrangement in contact with its cam, and linkage arrangement including an adjustable link operated by a third cam for opening and closing said jaws.

5. In a machine for making cones having a series of baking plates moving intermittently and a cake receiver, a transferring mechanism for cyclically removing flat cakes adhering to said baking plates and delivering them to said cake receiver, including a series of spaced peripheral cams mounted fixedly on a continuously driven shaft, linkage arrangement including a bell crank lever adapted to be operated by one of said cams for pivoting a balance arm trackway having a free end extending in operating position between said cake receiver and baking plates, said linkage arrangement having a link adjustable as to length to regulate the vertical swing of said balance trackway, parallel linkage having spring urging means for maintaining said linkage in operative contact with a second cam for reciprocating a slidable member carrying a pair of clamping jaws over said trackway, said parallel linkage having a link adjustable as to length for varying the distance which said slidable member is movable over said trackway, and linkage arrangement including a bell crank lever maintained by spring urging means into operative contact with a third cam for opening and closing said jaws of said slidable member, said linkage arrangement having an adjustable link for regulating the distance which said jaws may be opened.

References Cited in the file of this patent

UNITED STATES PATENTS

| | | |
|---|---|---|
| 1,804,039 | Tatosian | May 5, 1931 |
| 1,854,775 | Wichmann | Apr. 19, 1932 |
| 1,920,388 | Harrold | Aug. 1, 1933 |
| 2,321,634 | Tatosian | June 15, 1943 |